United States Patent [19]
Pembrook et al.

[11] 3,878,107
[45] Apr. 15, 1975

[54] ELECTRONICALLY COMPENSATED ROTATING GAS CELL ANALYZER

[75] Inventors: John D. Pembrook, Costa Mesa; Byron N. Edwards; Darrell E. Burch, both of Orange, all of Calif.

[73] Assignee: Philco-Ford Corporation, Blue Bell, Pa.

[22] Filed: June 24, 1974

[21] Appl. No.: 482,667

[52] U.S. Cl. .............. 250/343; 250/351; 250/510; 250/206; 250/565; 330/149; 356/188
[51] Int. Cl. .......................................... G01n 21/34
[58] Field of Search .......... 250/233, 343, 340, 341, 250/343–346, 564, 565, 206, 214 R; 330/149; 307/311; 356/93, 95, 188, 189, 51, 205

[56] References Cited
UNITED STATES PATENTS

| | | | |
|---|---|---|---|
| 3,471,798 | 10/1969 | Seidel | 330/149 |
| 3,488,491 | 1/1970 | Schuman | 250/345 |
| 3,588,496 | 6/1971 | Snowman | 356/205 |
| 3,790,798 | 2/1974 | Sternberg et al. | 250/345 |
| 3,793,525 | 2/1974 | Burch et al. | 250/351 X |
| 3,811,776 | 5/1974 | Blau, Jr. | 250/343 X |

*Primary Examiner*—Walter Stolwein
*Attorney, Agent, or Firm*—Robert D. Sanborn; Gail W. Woodward

[57] ABSTRACT

In a gas analyzer a beam of radiant energy is passed through a rotating gas cell which alternately inserts optically transmissive chambers into the path of the beam. One chamber contains a quantity of gas of the species to be analyzed at a pressure that produces sharp absorption lines. The other chamber is provided with either a quantity of gas at a pressure that produces substantial line broadening or a neutral density attenuator. In either case the chambers are made to have substantially equal average transmissivity over the spectral band of interest. The beam is then passed through a sample region in which the gas species concentration is to be measured. The beam is then detected by a photodetector. A filter, usually associated with the photodetector, limits the radiant energy response to a spectral region where the gas species to be measured displays suitable absorption lines.

An electronic system amplifies the photodetector output and demodulates that signal component which occurs at a frequency corresponding to the cell rotation rate. In the absence of the particular gas in the sample region the two cell chambers have equal average transmissivity, and there should be no such component. However, if a quantity of the gas species to be measured is present in the sample region, a rotation rate signal component will be present and will be in proportion to the total quantity of that gas species in the sample region.

In practice it is difficult to precisely balance the cell transmissivity values and, even if achieved, such balance is difficult to maintain. Accordingly the electronic amplifier is gain modulated at the cell rotation rate so that residual optical unbalance is corrected electrically. Since this correction is accomplished multiplicatively, it is independent of optical and electronic gain and loss values.

5 Claims, 2 Drawing Figures

ELECTRONICALLY COMPENSATED ROTATING GAS CELL ANALYZER

BACKGROUND OF THE INVENTION

U.S. Pat. No. 3,793,525 was issued to Darrell E. Burch, David A. Gryvnak, and John D. Pembrook on Feb. 19, 1974, and is titled Dual Cell Non-Dispersive Gas Analyzer. The patent is directed to an instrument for measuring small quantities of gas in a sample region in the presence of other gases that would ordinarily interfere with radiant energy absorption measurements. One of the elements shown is a rotating gas cell assembly that alternately inserts one and then the other of a pair of chambers into a beam of radiant energy which is thereby modulated by the cell assembly when the gas to be detected is present within the sample region. The nature of the modulation can be measured by an electronic circuit and related to the quantity of gas in the sample region.

Copending patent application Ser. No. 476,373, filed June 5, 1974, by John D. Pembrook, Darrell E. Burch, and Francis J. Gates, is titled Rotating Gas Correlation Cell. The application is directed to the structural features of an improved form of gas cell assembly.

U.S. Pat. No. 3,813,146 was issued on May 28, 1974, to John D. Pembrook, David A, Gryvnak, Darrell E. Burch and Francis J. Gates and is titled Light Beam Alternator Having a Single Rotating Mirror. This patent shows a rotating and fixed mirror combination that alternates a radiant energy beam between two spatial paths. Each path can contain a fixed gas chamber for operating a correlation measurement system.

In the prior art correlation systems, the optical transmissivities of two or more optical devices are adjusted or balanced to be equal over a limited spectral passband. When this condition exists and the devices are alternately inserted into a radiant energy beam the average beam energy will not be modulated at the alternation rate. As a practical matter the desired condition can be achieved by adjusting relative transmissivity until the beam modulation component at the alternation rate is minimized or nulled out. This can be achieved with good success, if some care is exercised, in systems employing fixed correlation cells such as the ones described in U.S. Pat. No. 3,813,146. However in the rotating cell systems such as the ones disclosed in U.S. Pat. No. 3,793,525 and application Ser. No. 476,373 filed June 5, 1974, it required a great deal of care and effort to get a good balance. Furthermore even if good balance is achieved, it may have to be repeated at intervals because of variations in relative cell transmissivity that occur with use. For example as dirt of other foreign material accumulates with use it may not be uniformly distributed and can cause unbalance.

SUMMARY OF THE INVENTION

It is an object of the invention to employ electronic correction for optical unbalance in a gas cell correlation optical measurement system where a radiant energy beam is alternated between at least two optical devices.

It is a further object of the invention to partly balance the radiant energy transmissivity in an alternating gas correlation cell system and to precisely balance the system electronically.

It is a still further object of the invention to electronically balance a slightly unbalanced optical alternating gas correlation cell measurement system by multiplicative signal processing to ensure balance even in the presence of system gain variations.

These and other objects are achieved in the following manner. An optical system employs a gas cell alternation arrangement wherein two or more radiant energy transmissive chambers are alternately placed in the path of a beam of radiant energy. Typically the beam is also chopped at a substantially higher frequency. The thus-modulated beam is then passed through a sample region in which the measurement is to be taken and then applied to a filter and photodetector combination. The filter passband is chosen to include a portion of the spectrum where the gas species to be measured has a suitable absorption line structure. The correlation cell chambers are manipulated to have average transmissivities that are equal over the filter passband but to have different fine structure transmissivities over the passband. Thus when no gas of the species to be measured is present in the sample region, the photodetector will have a signal output at the chopper frequency but there will be no signal at the alternation rate. If gas of the species to be measured is present in the sample region, the balance no longer exists and a photodetector output at the alternation rate will appear. In fact the alternation rate signal will be in proportion to the total quantity of gas species present in the sample region.

In the invention the photodetector signal is amplified at the chopper frequency and then demodulated in a chopper-frequency demodulator. The demodulated signal is filtered, and amplified at the alternation frequency, and demodulated synchronously using a reference signal precisely related to the alternation mechanism. The synchronous demodulator output is then measured to indicate the quantity of the gas species being measured. As a practical matter the gas correlation cell chambers are approximately adjusted for balance which is a relatively easy matter. This will result in a signal being present at the first or chopper-frequency amplifier at the alternation signal frequency. The synchronous demodulator reference signal is applied at suitable phase and in controlled amplitude to a modulator incorporated into the amplifier. This modulator is arranged so as to change the gain of the amplifier at the alternator rate. The amplitude of the gain change is adjusted until the alternator frequency signal at the chopper-frequency demodulator is nulled or balanced out. Since the amplifier gain is changed by the modulator, the correction is multiplicative and will be effective even though the optical and/or electronic gain varies. If an additive (or subtractive) cancellation signal were to be used, it would only be correct for one overall gain setting and it would not be correct if the radiant energy source were to vary or if the photodetector output or signal amplifier gain were to vary.

Thus using the invention permits an easily adjusted precision balance to be achieved in a system that needs critical balance. This permits not only a precise initial balance, but the system can be easily rebalanced as often as is needed for highly accurate readings.

DESCRIPTION OF THE INVENTION

Figure 1:
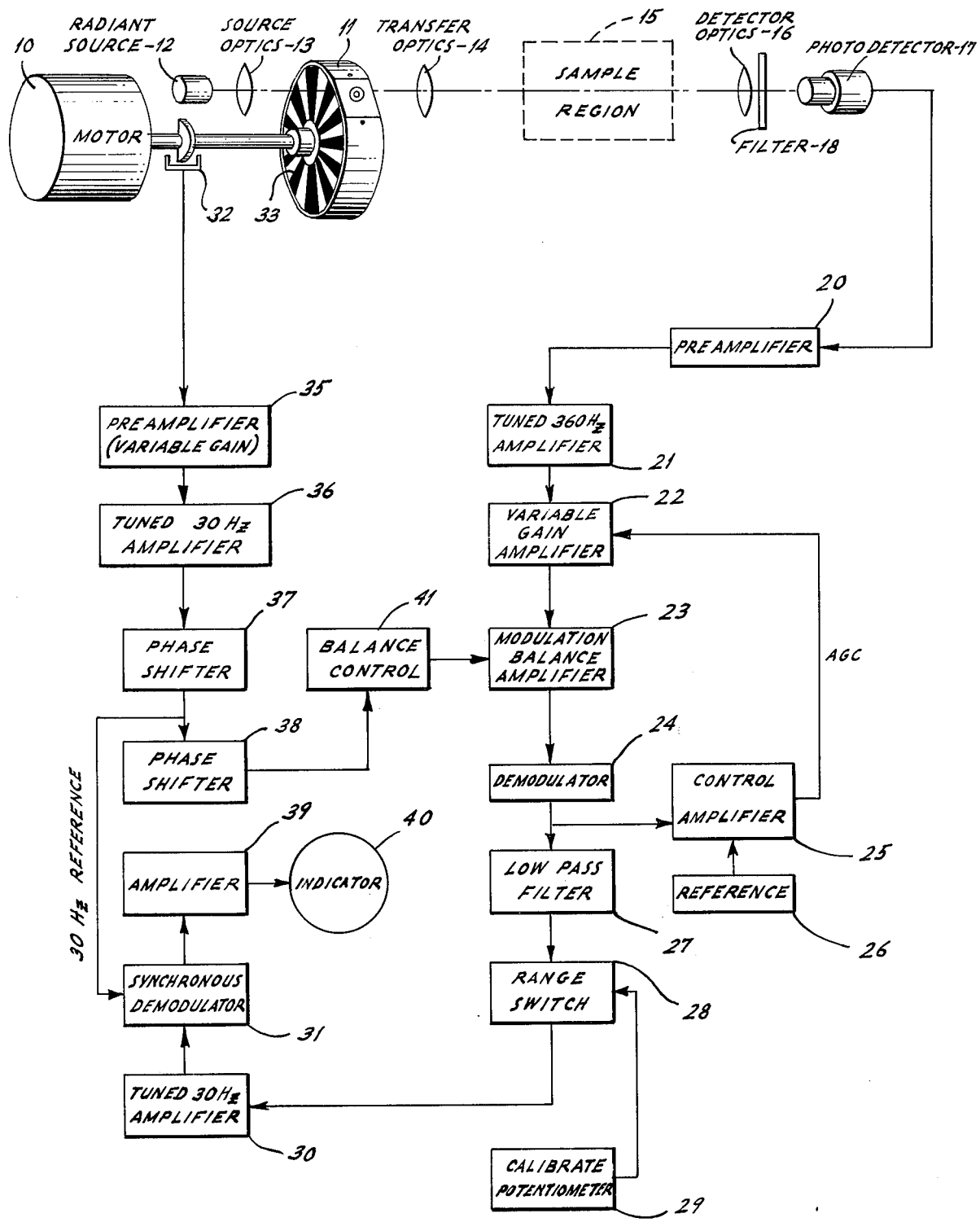
FIG. 1 is a block diagram showing the elements employed in a preferred embodiment of the invention.

Referring to FIG. 1, a rotating gas correlation cell of the kind shown in patent application Ser. No. 476,373 filed June 5, 1974, is shown as element 11. Briefly cell 11 contains two diametrically opposed chambers (not shown in FIG. 1) each occupying half of the cylindrical structure, the flat faces of which are closed and hermetically sealed by radiant energy transmissive windows. One chamber is filled with a quantity of gas of the species to be measured at a pressure that results in a sharp well-defined absorption line structure. The other chamber either contains a quantity of the same gas at a substantially higher pressure that results in some obscuration of the line structure as taught in U.S. Pat. No. 3,793,525, or the second chamber can be filled with a gas that does not absorb at the wavelength of interest provided that a neutral density attenuator is associated with the corresponding portion of the cell window. In either of the above two cases the gas pressures and concentrations or attenuator constant are adjusted so that the two chambers have approximately (but not necessarily exactly) equal average radiant energy transmissivity over the spectral region of interest. It is noted that while exact balance is very difficult to achieve and maintain; an approximate balance is relatively easy.

Cell 11 is rotated by motor 10 so that the two chambers are alternately inserted into a beam of radiant energy produced by radiant energy source 12 and optics 13. The beam is also interrupted by chopper 33 which is comprised of a series of opaque sectors associated with the entrance window of gas cell 11. If desired the chopper could be separately constituted and driven or it could be associated with the window on the exit side of cell 11. Typically motor 10 will be a synchronous 1800 rpm device which produces a cell rotation rate of 30 Hz. If chopper 33 involves 12 sector blades as shown, the chopping frequency will be 360 Hz. Other frequencies can be employed if desired.

Rotation sensor 22, which is desirably an optoelectronic assembly, is employed to generate an electrical signal at 30 Hz and having a phase precisely related to the rotation of cell 11.

Transfer optics 14 forms the radiant energy emerging from cell 11 into a substantially parallel beam that traverses sample region 15. Detector optics 16 focuses the beam onto the sensitive region of photodetector 17. As shown, filter 18 is interposed in front of photodetector 17 but the filter could be located at any point in the radiant energy system. Filter 18 confines the system passband to that portion of the spectrum where the gas species to be measured displays a suitable absorption line structure. The filter can be selected in terms of bandwidth and peak response wavelength to control system detection sensitivity and response to interfering gases. In general the narrower the filter passband the greater will be the freedom from interference; however, too narrow a response will make filter tuning a problem and will limit the amount of energy that reaches the photodetector. This in turn requires a photodetector with a lower inherent noise level.

The output of photodetector 17 is applied to a low-noise preamplifier 20 and the amplified signal passed through tuned amplifier 21. This amplifier is tuned to the 360 Hz chopper frequency and is sufficiently broadband to accommodate an alternation rate of 30 Hz as modulation sidebands of the basic 360 Hz signal.

By using an ac amplifier and treating the alternation frequency as sidebands, the 1/F noise of the photodetector is less than that at the alternator frequency. This greatly enhances system detectivity. The signal is then applied to a variable gain amplifier 22, desirably operated in an automatic gain control (AGC) mode. This is followed by a modulation balance amplifier 23, the function of which will be described below, and a demodulator 24. The average output of demodulator 24 is sensed by control amplifier 25 and compared with a fixed dc reference 26. The output of control amplifier 25 varies the gain of amplifier 22 to hold the average dc output of demodulator 24 at very nearly the magnitude of reference 26. This action will compensate for variations in source 12, all optical components, photodetector 17, the amplifiers ahead of demodulator 24 and variable density in sample region 15. With a good AGC action the signal out of demodulator 24 will be a controlled dc component which represents the magnitude of the chopped radiant energy and a 30 Hz component which represents the differential unbalance of the system due to the rotating gas cell. If the gas cell is precisely balanced, so as to have equal average transmittance in its two halves, any 30 Hz signal at the output of demodulator 24 will be proportional to the quantity of gas species to be measured in sample region 15 and can be calibrated thereto.

Low pass filter 27 is designed to pass 30 Hz signals while eliminating the 720 Hz component resulting from demodulating the 360 Hz carrier. The filter is followed by a range switch 28, which is a calibrated step attenuator, and calibrate potentiometer 29 which is used to accurately adjust the system response. The switch is followed by a tuned 30 Hz amplifier 30 which also desirably contains a 60 Hz notch or rejection filter (not illustrated in the block diagram). The amplifier output signal is demodulated by a synchronous demodulator 31 which is used because of its excellent low noise and noise rejection characteristics and its linear performance. Good noise performance in this portion of the equipment is important because very weak signals will be encountered when low gas species concentrations are being measured.

Demodulator 31 receives its reference signal excitation by way of reference pickup 32 which produces a signal at the correlation cell rotation rate and in a precisely related phase. The reference signal is amplified in preamplifier 35 and then in a tuned 30 Hz amplifier 36. The amplified reference is passed through phase shifter 37 to supply the reference phase for demodulator 31. The magnitude of the phase shift in circuit 37 is adjusted to compensate slight inaccuracies in the angular placement of pickup 32 and for signal circuit delays encountered in blocks 20, 21, 22, 23, 24, 27, 28, and 30 which may be different from the inherent reference circuit delays encountered in blocks 35 and 36.

The synchronously demodulated signal, which is now a dc voltage related in magnitude to the quantity of gas species being measured, is applied to amplifier 39 and displayed on indicator 40 which may be a simple voltmeter. The output display on indicator 40 can be calibrated by means of potentiometer 29 and range switch 28 to read directly in terms of gas species quantity.

In the situation where the radiant energy transmissivities of the two chambers of gas cell 11 are equal over the passband of filter 18, the output indicator 40 will read zero when no gas of the species being measured (as determined by the characteristics of cell 11 and filter 18) is present in sample region 15. Since this is a very difficult state to achieve in practice, balance control 41 is employed in combination with modulation balance amplifier 23. Assuming that optical balance is not complete, a 30 Hz signal component will be present at the output of demodulator 24, even though sample region 15 is empty of gas of the species to be measured. To compensate, a 30 Hz reference signal obtained from phase shifter 38, which is in cascade with phase shifter 37, is applied to the balance control 41. This balance control 41 varies the gain of the modulation balance amplifier 23 at a 30 Hz rate. This gain change has a fixed phase relationship to the 30 Hz reference supplied by phase shifter 38. A switch (not shown in FIG. 1) is included in control 41 or phase shifter 38 to selectively invert the phase sense of the 30 Hz reference. Phase shifter 38 is adjusted so that when the reference signal is applied to amplifier 23 the gain will be varied precisely as a function of which chamber of cell 11 is in the radiant energy beam. The signal phase sense out of phase shifter 38 will be set depending upon which gas cell chamber has the greatest transmissivity. The balance control 41 and phase sense switch are adjusted to produce minimum 30 Hz signal component while no gas of the species to be measured is in sample region 15. Thus even though optical balance is not exact, the electronic circuit compensates the unbalance. Also since the modulation balance amplifier has its gain changed in synchronism with the 30 Hz reference signal, the compensation is multiplicative in nature. This ensures accurate balance compensation even though the optical levels, photodetector response, and 360 Hz amplifier gain were to be varied. This greatly facilitates equipment operation and permits easy rebalance as often as is deemed desirable.

Figure 2:
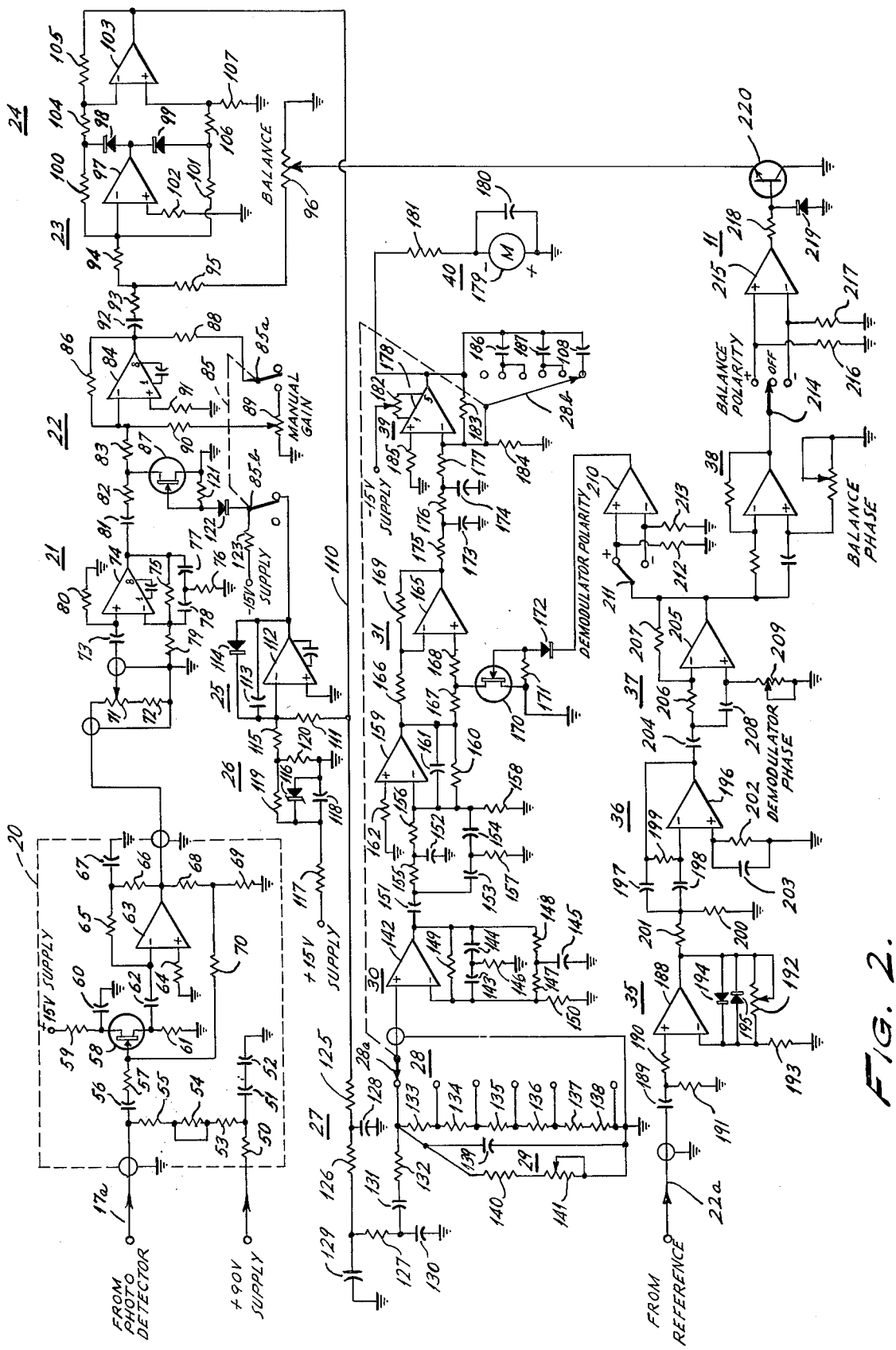
FIG. 2 is a schematic diagram of the electronic portions portrayed in FIG. 1.

FIG. 2 is a schematic diagram of the electronic components of a typical circuit organized as shown in FIG. 1. It will be noted that microelectronic operational amplifiers are used extensively. Hereinafter these will be referred to as op amps. In the symbols used in FIG. 2 the + and − signs associated with the op amp symbols represent the noninverting and inverting input terminals, respectively of such amplifiers. Where numbers are shown inside the symbols, they represent the pin connections used for external compensation. Where compensating capacitors are shown connected, they are 30 picofarad compensating elements that will not be referred to further. While not shown, each microcircuit is supplied with regulated, heavily filtered, + and − 15-volt power. The following circuit description will be related to the block functions and numbers of FIG. 1.

Preamplifier 20 is shown inside the dashed outline 20. Photodetector 17 (of FIG. 1) which is typically photoconductive in nature, is biased by the 90-volt power supply and connected between terminals 17a and ground of amplifier 20. Resistor 50 and capacitors 51 and 52 comprise a decoupling filter and resistors 53, 54, and 55, which are of the low-noise deposited-film type, act as the photodetector load. One or more of these three load resistors may be shorted (or strapped out) to provide an optimum load value for the particular photodetector being used. The photodetector output signal is ac coupled by capacitor 56, by way of isolation resistor 57, to the gate of junction field effect transistor (JFET) 58 which is connected as a self-biased source-follower amplifier. Resistor 59 and capacitor 60 act as a decoupling filter to connect the drain of JFET 58 to a +15 volt power supply. Source load resistor 61 provides the output which is ac coupled by capacitor 62 to the inverting input of op amp 63, the noninverting input of which is returned to ground through resistor 64. Resistors 65 and 66 stabilize the dc operating point of op amp 63 and capacitor 67 acts as an ac feedback bypass. Resistors 68, 69, and 70 provide negative signal feedback to control the gain of preamplifier 20. Typically the value of resistor 70 is made about equal to the photodetectors resistance. Resistors 68 and 69 are selected to adjust the gain of preamplifier 20 so that a desirable signal output level and signal to noise performance of the photo detector-preamplifier combination are achieved.

The preamplifier output is applied to a gain control which is comprised of potentiometer 71 and minimum gain set resistor 72. The gain control output is ac coupled by capacitor 73 to the noninverting input of op amp 74 which provides the gain function of amplifier 21. The output of op amp 74 is coupled to its inverting input by means of a bridged T feedback filter comprised of resistors 75 and 76 and capacitors 77 and 78. Resistor 79 terminates the feedback filter and resistor 80 returns the op amp 74 noninverting input to ground. The filter components are selected to tune amplifier 21 to 360 Hz and the circuit, using the component values to be listed below, has an effective Q of about 3.5.

The output of op amp 74 is ac coupled by capacitor 81 to variable gain amplifier 22. Resistors 82 and 83 couple the signal to op amp 84 which has provision for selecting automatic (as shown) or manual gain control by the action of switch 85. Resistor 86, in conjunction with the resistors connected to the inverting input of op amp 84, sets the maximum gain of the stage. JFET 87 acts in the automatic mode (as will be detailed below) to vary the stage gain. In the manual mode, switch section 85a connects feedback resistor 88 to manual gain potentiometer 89. The arm of potentiometer 89 is connected by way of resistor 90 to op amp 84 input. In the manual mode, switch 85b disables the automatic function by providing a high negative bias to the gate of JFET 87 thereby turning it off. Therefore potentiometer 89 alone varies the gain of amplifier 22. Resistor 91 returns the noninverting input of op amp 84 to ground.

Capacitor 92 ac couples amplifier 22 to modulation balance amplifier 23. Resistors 93, 94, and 95 in conjunction with potentiometer 96 act as attenuator elements that can modulate the signal passed to op amp 97 as will be described below. Op amp 97 drives two rectifier diodes 98 and 99 in a fullwave rectification circuit. Resistor 100 acts as the load for diode 98 and also acts as one negative feedback of stabilization resistor for op amp 97. Resistor 101 acts as the load for diode 99 and acts as the other stabilization resistor for op amp 97. Resistor 102 returns the noninverting input of op amp 97 to ground. The outputs of diodes 98 and 99 are direct coupled differentially to a unity gain op amp 103. Equal value resistors 104 and 105 couple diode 98 to the inverting input of op amp 103 and establish a unity gain characteristic. Resistors 106 and 107 couple diode 99 to the noninverting input of op amp 103 and establish balanced drive. The circuit, involving the output of op amp 97, the two diodes and op amp 103, is an extremely linear fullwave rectifier. This means that line 110 will carry a demodulated version of the 360 Hz input signal. As explained above, the amplitude of the 30 Hz modulation component is proportional to the quantity of the gas species being measured which is present in sample region 15. The dc present on line 110 will represent the total chopped radiant energy being sensed by the photodetector.

Line 110 is directly coupled by resistor 111 to control amplifier 25. Op amp 112 is connected as a high gain inverting amplifier with capacitor 113 connected to make the amplifier act in the integrating mode. Capacitor 113 in conjunction with resistor 111 causes control amplifier 25 to act as a long time constant linear integrator. Diode 114 is connected to reduce the amplifier gain to a very low value in the event that the inverting input of op amp 112 is ever driven below ground potential.

Reference potential source 26 is also connected to the inverting input of op amp 112 by resistor 115 which has the same value as resistor 111. Zener diode 116 is operated or biased from the +15 v supply by resistor 117 and is bypassed by capacitor 118. Resistors 119 and 120 divide the constant 5.6 volts across diode 116 to provide a stable reference of about +1.4 volts at the left hand end of resistor 115. Thus, if line 110 is operating at −1.4 volts, the rate of change in the voltage at the output terminal of op amp 112 will be zero (because the noninverting input of op amp 112 is grounded).

If switch 85 is in its AUTOMATIC position as shown, the above described conditions will result in a constant gate bias on JFET 87 of about −3 volts. It will be noted that resistor 121 returns the gate of JFET 87 to its source and diode 122 directly connects the gate to the output of op amp 112. Since JFET 87 is of the depletion mode type, zero voltage gate bias means that it has a very low resistance between its drain and source electrodes. It acts with resistor 82 as an attenuator and can impose a very large signal loss to op amp 84. This in turn means a very low signal level at demodulator 24 and a low negative voltage on line 110. With a low voltage on line 110 the reference voltage will drive the input to op amp 112 positive and this in turn will produce a negative output. At sufficient negative output, diode 122 will begin to conduct and drive the base of JFET 87 negative. When the JFET base is driven sufficiently negative, its source to drain resistance will rise and thus increase the signal applied to op amp 84 and hence the signal applied to demodulator 24. This in turn will increase the negative voltage on line 110. The above action is clearly self stabilizing. The voltage on line 110 will seek a value that will bias op amp 112 at a level that will establish the gate bias on JFET 87 so as to establish the signal level needed for demodulator 24. In practice the voltage on line 110 will always be of opposite polarity and usually at a slightly different magnitude than the 1.4 volt reference level by an amount sufficient to charge (or discharge) capacitor 113 through resistor 111 to drive the output of op amp 112 sufficiently negative to operate JFET 87 at the required source-drain resistance value. Since op amp 112 has a very high gain value, the voltage differential will be very slight at equilibrium and will approach the equilibrium value as a function of the time constant of the AGC loop that is set by resistor 111 and capacitor 113. This time constant is typically 1 second. The above AGC circuit action shows that regardless of input levels, optical levels, and amplifier gain values, the signal on line 110 is maintained at a substantially constant dc value. As taught in U.S. Pat. No. 3,793,525 this means that the amplitude of the 30 Hz component on line 110 is proportional to the quantity of gas species in sample region 15. Accordingly a measure of this component can be calibrated in terms of gas species content.

Resistors 125, 126, and 127 along with capacitors 128, 129, and 130 comprise low pass filter 27. The time constants are selected so that the 30 Hz component is passed and the 720 Hz component is rejected. Capacitor 131, ac couples the output of filter 27 to range switch 28. Section 28a is connected so that a tap on a resistor ladder can be selected to establish a known attenuation step. The ladder is comprised of resistors 132 through 138. The six range switch positions give relative gain values of 0.3, 0.1, 0.03, 0.01, 0.003, and off as established by the resistor values. Capacitor 139 is connected to further attenuate high frequency signal components. Resistor 140 and variable resistor 141 comprise the elements of calibrate potentiometer 29. With a known amount of gas in sample region 15, resistor 141 is set to produce a given signal level by changing the load on resistor 132. The positions of range switch 28a are thereby automatically established.

The arm of switch 28a is directly connected to the noninverting input of op amp 142. This input has a very high impedance and does not significantly load range switch 28. The inverting input of op amp 142 is driven from a twin T filter connected to its output. This makes the device a band-pass or tuned amplifier 30. Capacitors 143, 144, and 145 along with resistors 146, 147, and 148 are selected to give the twin T filter a 30 Hz resonance. Resistor 149 is selected to give amplifier 30 a Q of about 8. Resistor 150 terminates the twin T filter.

Capacitor 151 ac couples the 30 Hz signal to op amp 159 through a twin T notch filter comprised of capacitors 152, 153, and 154 and resistors 155, 156, and 157. The components are selected to produce a notch and hence signal rejection at 60 Hz. Resistor 158 terminates the notch filter. Resistor 160 and capacitor 161 provide for ac and dc stabilization of op amp 159 and set its gain value. Resistor 162 returns the noninverting input of op amp 159 to ground.

The output of op amp 159 is resistor coupled to op amp 165 and JFET 170 that comprise synchronous demodulator 31. Resisotr 166 connects to the inverting input of op amp 165 while resistors 167 and 168 in series connect to the noninverting input. Feedback resistor 169 makes the amplifier a unity gain device by way of resistor 166. If JFET 170 is off or in its high resistance state, it can be seen that both inputs of op amp 165 receive equal signals and for this condition the amplifier will have unity gain and the output will equal the input. Any output that is unequal to the input will result in an error voltage at the inverting input by way of resistor 169. This will cause the amplifier to correct the output. JFET 170 is a depletion device and with its gate returned to its source by resistor 171, its resistance will be very low, a few tens of ohms or so. As long as diode 172 is not conducting this condition will prevail and it can be seen that very little signal will be applied to the noninverting input of op amp 165. For this condition the output of op amp 159 will appear (inverted) at the output of op amp 165. If a 30 Hz (preferably a square wave) signal is fed to diode 172, JFET 170 will be turned off and on (or switched) at a 30 Hz rate. If the phase of this signal coincides with the 30 Hz input, alternate half cycles will be inverted and appear along with the other non-inverted alternate half cyles as dc at the output of op amp 165. Thus circuit 31 is a full wave synchronous low-noise linear demodulator.

The output of op amp 165 is direct coupled by a low pass filter, comprised of capacitors 173 and 174 and resistors 175, 176, and 177, to the inverting input of op amp 178. This filter passes the dc output from demodulator 31 while rejecting the 60 Hz ripple from the demodulator and other signal components at higher frequency. Op amp 178 drives meter 179 which is by-passed by capacitor 180. Resistor 181 establishes the voltage sensitivity of meter 179. Potentiometer 182 is connected between the offset compensation terminals of op amp 178 and its arm is connected to the −15 v supply so that it acts as a meter zeroing control. Resistors 183 and 184 control the negative feedback around op amp 178 to stabilize it and set the gain value. Resistor 185 returns the noninverting input to ground. Switch section 28b, which is ganged to the range switch, selectively connects one of capacitors 186, 187, or 108 into the feedback circuit around op amp 178 thus switching the meter time constant. The capacitors are selected so that the highest instrument gain or the most sensitive position of switch 28, invokes the longest time constant for the meter amplifier 39 circuit. In effect the meter readings are time integrated with the longer times occurring at the most sensitive setting. This action reduces random meter motion or noise when very low gas concentrations are being measured. Thus the circuits located between demodulator 24 and indicator 40 comprise a very sensitive calibrated ac voltmeter responsive to a frequency of 30 Hz.

As described above, demodulator 31 requires a 30 Hz reference signal. This is derived from pickup 22 which produces an output related to the rotation of gas cell 11. Typically this pickup will produce a 30 Hz signal of about 400 mv on line 22a. This signal is ac coupled to the noninverting input of op amp 188 by capacitor 189 and through resistor 190. Resistor 191 returns the noninverting input to ground. Gain control variable resistor 192 in conjunction with resistor 193 stablilizes op amp 188 and establishes the gain of preamplifier 35. Diodes 194 and 195 act to limit the maximum signal output of amplifier 35. Op amp 196 is operated as a tuned amplifier by virtue of the bridged T filter connected between its output and inverting input. The filter components, comprising capacitors 197 and 198 along with resistors 199, 200 and 201, are selected to provide a 30 Hz band pass with a gain of about 5 and a Q of about 5. The output of op amp 188 is coupled by way of resistor 201 into the tuned amplifier 36. Resistor 202 returns the noninverting input of op amp 196 to ground and is bypassed for ac by capacitor 203. The tuned amplifier output is a sine wave and is adjusted to a 1 volt rms amplitude by means of variable resistor 192.

The output of amplifier 36 is ac coupled by capacitor 204 to phase shifter 37. Op amp 205 is the heart of phase shifter 37. Resistors 206 and 207 make the stage gain unity. The input of phase shifter 37 is also coupled to the noninverting input of op amp 205 by capacitor 208. The noninverting input is returned to ground through variable resistor 209. The output of op amp 205 is the vector sum of the two inputs. Clearly varying the value of resistor 209 will vary both the amplitude and phase of the signal applied to the noninverting input. Due to the heavy negative feedback, the unity gain characteristic is maintained at all phase angles. If resistor 209 is set to zero resistance, the phase shift will be 180°. If resistor 209 is set to a value where resistance is large compared to the capacitive reactance of capacitor 208 the noninverting signal input will dominate and the output phase shift will be low, typically about 60°.

The output of op amp 205 is directly connected to either input of op amp 210 as selected by switch 211. Resistors 212 and 213 serve to return the unconnected input to ground. As pointed out above, the phase shift control, resistor 209, operates the circuit over a range of about 120°. The polarity switch 211 doubles the effective range of the phase control. Op amp 210 will convert the sine wave input to a symmetrical square wave which is applied to JFET 170 by way of diode 172. Due to the action of op amp 210, JFET 170 will be switched on for one half of the reference cycle and off for the other half. Ordinarily reference pickup 22 will be located with respect to gas cell 11 so that its output will be a 30 Hz signal phased so that it is passing through zero when the optical beam is being switched from one chamber to the other. The phase shift control can be used to compensate for an error in the zero crossing as sensed by pickup 22. This is helpful because it is difficult to precisely locate pickup 22 mechanically. The control can further compensate for signal channel delays in the block elements numbered 20, 21, 22, 23, 24, 27, 28, and 30 which may be different from the reference channel delays in the block elements 35 and 36.

Phase shifter 38 is identical to phase shifter 37 and is connected in cascade therewith. The output of phase shifter 38 is connected to the arm of switch 214 which has three positions. In the center, or off, position no signal is transferred. The two outer positions permit applying the signal from shifter 38 to either input of op amp 215. As in op amp 210, op amp 215 acts as a squaring amplifier converting the sine wave input to a symmetrical square wave. Resistors 216 and 217 return the unconnected input to ground. Resistor 218 directly couples the square wave to the base of transistor 220. On the negative going position of the square wave, diode 219 will conduct and transistor 220 will be turned off. On the positive going portion of the square wave, transistor 220 will be turned on and will conduct. When the transistor is turned on its emitter-collector resistance is low. Thus at the 30 Hz rate the arm of potentiometer 96 is effectively grounded on alternate half cycles. Since this control is in the attenuator portion of the input to op amp 97, the gain of the 360 Hz signal section will be lowered for every other half cycle at the 30 Hz alternation rate. In operation, phase shifter 38 is adjusted until this switching action occurs when the radiant energy beam is being switched from one chamber to the other in the gas cell 11. The phase shifter is also adjusted to correct for any difference in the signal delays between blocks 23, 27, 28, and 30 and the inherent reference signal delay in blocks 38 and 41. Potentiometer 96 is adjusted so that the difference in alternate halfcycle amplifier gain is equal to the optical unbalance. Polarity switch 214 is set to one or the other phase position depending upon which chamber in gas cell 11 has the highest average transmissivity. Thus if an unbalance exists, phase shifter 38 and potentiometer 96 are adjusted to null out the unbalance. If a null cannot be achieved switch 214 is moved to the opposite polarity and the system nulled. If the optical balance is perfect, switch 214 can be set in the off position or potentiometer 96 can be set in the minimum effect position.

The following list represents a set of components that permit successful operation of the circuit of FIG. 2. All capacitors are rated at 50 volts unless otherwise specified.

| | |
|---|---|
| Resistors 50, 149, 171, 183, 191, 121 | - 100K ohms |
| Capacitors 51, 52 | - 22 microfarads |
| Resistors 53, 54, 55 | - 1 Megohm (low noise film type) |
| Capacitor 56 | - 0.1 microfarad 200 v. |
| Resistors 57, 64, 158, 166, 169, 206, 207 | - 22k ohms |
| JFETs 58, 87, 170 | - 2N4391 |
| Resistor 59 | - 470 ohms |
| Capacitors 60, 62, 67, 118, 151, 173, 108, 204 | - 10 microfarads |
| Resistors 61, 79, 88, 193 | - 1k ohms |
| Op amps 63, 97, 103, 142, 159, 165, 178, 188, 196, 205, 210, 215 | - Type 741 |
| Resistors 65, 66, 68, 167, 168, 185, 212, 213, 216, 217 | - 10k ohms |
| Resistor 69 | - Nominal 5k (the value is selected to accommodate particular photodetector) |
| Resistor 70 | - 3 Megohms |
| Potentiometer 71 | - 50k ohms |
| Resistor 72 | - 9.09k ohms |
| Capacitors 73, 77, 78, 139, 197, 198, 203 | -0.1 microfarad |
| Op amps 74, 84, 112 | - LM301A (Signetics Inc.) |
| Resistor 75 | - 27k ohms |
| Resistor 76 | - 3.9k ohms |
| Resistor 80 | - 220k ohms |
| Capacitor 81 | - 0.33 microfarad |
| Resistor 82 | - 15k ohms |
| Resistors 83, 150 | - 1.5k ohms |
| Switch 85 | - DPDT |
| Resistor 86 | - 150k ohms |
| Potentiometer 89 | - 5k ohms |
| Resistor 90 | - 3.3k ohms |
| Resistors 91, 155, 156, 200 | - 5.6k ohms |
| Capacitors 92, 113, 128, 145, 152, 208, 189 | - 1 microfarad |
| Resistors 93, 94 | - 2.21k ohms |
| Resistor 95 | - 2.37k ohms |
| Potentiometer 96 | - 1k ohms |
| Diodes 98, 99, 114, 122, 172, 194, 195, 219 | - 1N914 |
| Resistors 100, 101 | - 5.1k ohms |
| Resistors 102, 120 | - 2.2k ohms |
| Resistors 104, 105 | - 30k ohms |
| Resistor 106 | - 33k ohms |
| Resistor 107 | - 47k ohms |
| Resistors 111, 115 | - 1 Megohm |
| Diode 116 | - 1N752A (5.6 v. zener) |
| Resistor 117 | - 470 ohms |
| Resistor 119 | - 6.8k ohms |
| Resistors 125, 126, 127, 140, 157 | - 2.7k ohms |
| Capacitors 129, 130, 131, 143, 144, 153, 154 | - 0.47 microfarad |
| Resistor 132 | - 68.1k ohms |
| Resistor 133 | - 19.6k ohms |
| Resistor 134 | - 6.81k ohms |
| Resistor 135 | - 1.96k ohms |
| Resistor 136 | - 681 ohms |
| Resistor 137 | - 205 ohms |
| Resistor 138 | - 86.6 ohms |
| Variable Resistors 141, 192, 209 | - 20k ohms |
| Switch 28 | - DP-6POS |
| Resistor 146 | - 6.2k ohms |
| Resistors 147, 148 | - 11.5k ohms |
| Resistors 160, 202 | - 470k ohms |
| Capacitor 161 | - .0056 microfarad |
| Resistor 162 | - 18k ohms |
| Capacitor 174 | - 6.8 microfarads |
| Resistors 123, 175 | - 4.7k ohms |
| Resistors 176, 177 | - 12k ohms |
| Meter 179 | - 100 microamperes |
| Capacitor 180 | - 47 microfarads 20 v. |
| Resistor 181 | - 9.09k ohms |
| Potentiometer 182 | - 10k ohms |

-Continued

| | |
|---|---|
| Resistors 184, 190 | - 20k ohms |
| Capacitor 186 | - 2.2 microfarads |
| Capacitor 187 | - 4.7 microfarads |
| Resistor 199 | - 562k ohms |
| Resistor 201 | - 130k ohms |
| Switch 211 | - SPDT |
| Switch 214 | - SPDT (center off) |
| Resistor 218 | - 15k ohms |
| Transistor 220 | - 2N2222A |

Using the above-described electronic system, it was found that a 5 percent optical error or differential in gas cell transmissivity could be corrected to about 0.002 percent without difficulty. Furthermore, it was found that as optical balance tended to vary with time, due for example to a change in the temperature of the correlation cell or to a fleck of dust on one of the cell windows, rebalancing was easy.

While the above-described system was directed to the rotating gas cell optical system using two-frequency electronics, it can also be applied to fixed gas cell systems and also to single frequency electronics. In addition many other circuit equivalents will occur to a person skilled in the art. Accordingly, it is intended that the scope of our invention be limited only by the following claims.

We claim:

1. In a radiant energy gas analyzer including a source of radiant energy, means for forming the output of said source into a beam, a multi-chambered gas correlation cell, said cell having associated means for passing said beam alternately through different chambers therein, said chambers being adapted to act in a wavelength selective manner on said radiant energy whereby said beam is conditioned at the rate of alternation, means for passing said conditioned beam through a sample region wherein a gas measurement is to be taken, means for selecting a predetermined portion of the frequency spectrum of said radiant energy, and a photodetector to convert said selected portion of the frequency spectrum into electrical energy whereby as said chambers in said cell are alternated in the path of said radiant energy said electrical energy will contain signal elements proportional to the quantity of said gas in said sample region, an electronic signal processing system comprising:

output indicating means for displaying signal magnitude, a first amplifier connected in the circuit intermediate between said photodetector and said output indicating means, a modulator connected to said first amplifier to cause the gain of said first amplifier to vary in phase with a reference signal supplied to said modulator, means for adjusting the amount of gain change applied by said modulator, means for generating a reference signal in synchronism with said alternation, a second amplifier connected to said means for generating said reference signal to amplify said reference signal, said second amplifier including means for varying the amplitude and phase of the signal being amplified, and means for applying the amplified reference signal to said modulator whereby a residual unbalance in the transmission characteristics of said chambers can be compensated by adjusting the phase of said second amplifying means and by adjusting the amount of gain change applied to said first amplifier by said modulator.

2. The analyzer of claim 1 including means for chopping said radiant energy at a frequency that is substantially higher than the rate at which said beam is alternatly passed through said different chambers and said first amplifier is a two frequency device comprising:
  a high frequency amplifier connected to said photodetector,
  means for tuning said high frequency amplifier to the frequency of said chopping means,
  means for demodulating the output of said high frequency amplifier,
  a low frequency amplifier connected to said demodulator and tuned to a frequency equal to said rate of alternation,
  means for demodulating the output of said low frequency amplifier and displaying the result on an indicator, and wherein
said modulator is connected to vary the gain of said high frequency amplifier.

3. The analyzer of claim 2 wherein said means for demodulating the output of said high frequency amplifier is connected to a control amplifier having a reference supply voltage and said control amplifier is connected to vary the gain of said high frequency amplifier to maintain a constant average output from said high frequency amplifier.

4. The analyzer of claim 3 wherein said means for demodulating the output of said low frequency amplifier is a synchronous demodulator that is provided with a reference signal obtained from said second amplifier.

5. The analyzer of claim 4 wherein said indicator comprises a direct current meter and said low frequency amplifier operates in conjunction with a precision step attenuator and calibration means whereby said indicator can be read directly in terms of said gas measurement.

* * * * *